United States Patent Office 3,194,809
Patented July 13, 1965

3,194,809
TRIFLUOROPROPENE-PYRIDINE COMPOUNDS AND METHODS FOR THEIR PRODUCTION
John R. Dice and Martin L. Black, Ann Arbor, Mich., assignors to Parke, Davis & Company, Detroit, Mich., a corporation of Michigan
No Drawing. Original application Aug. 14, 1961, Ser. No. 131,094, now Patent No. 3,142,683, dated July 28, 1964. Divided and this application Sept. 19, 1963, Ser. No. 310,134
2 Claims. (Cl. 260—290)

The present application is a division of copending application, Serial No. 131,094, filed August 14, 1961, now U.S. Patent No. 3,142,683.

The present invention relates to trifluoropropene compounds and to methods for their production. In particular, the invention is concerned with novel 3,3,3-trifluoro-1-propene compounds of the formula

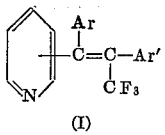

(I)

where Ar represents phenyl or chlorophenyl and Ar' represents phenyl, chlorophenyl or methoxyphenyl.

In accordance with the invention 3,3,3-trifluoro-1-propene compounds of the above formula are produced by reacting trifluoropropanol compounds of the formula

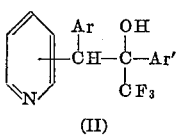

(II)

with a dehydrating agent; where Ar and Ar' are as defined before. Suitable dehydrating agents are mixtures of a tertiary amine with an acid halide. The use of a dehydrating agent of this type favors a stereospecific dehydration. Examples of acid halides which can be used are thionyl chloride, acetyl chloride and acetyl bromide. Examples of tertiary amines which can be used are pyridine, triethylamine and dimethylaniline. At least one equivalent and preferably a moderate or large excess of the dehydrating agent is employed. With a mixture of a tertiary amine and an acid halide, the preferred reaction temperature is from 0–50° C. although satisfactory results are also obtained outside of this range. Additional unreactive solvents may also be incorporated in the reaction mixtures. The product is isolated either as an acid addition salt or the free base by pH adjustment.

The trifluoropropanol compounds of formula II used as starting materials in the foregoing process are prepared by reacting an α,α,α-trifluoroacetophenone compound of the formula Ar'—COCF₃

(III)

with an alkali metal derivative of an aralkylpyridine compound of the formula

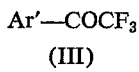

(IV)

under anhydrous conditions followed by hydrolysis of the resulting reaction product as described in copending application, Serial No. 131,094. In Formulas III and IV Ar and Ar' are as defined before. The trifluoropropanol starting materials are produced in stereoisomeric forms and, if the individual diastereoisomers are desired, they are obtained by fractional crystallization of the reaction product.

The 3,3,3-trifluoro-1-propene compounds of the invention exist in stereoisomeric forms which are geometric or cis-trans isomers. In the case of a stereospecific dehydration, a single diastereoisomeric 3,3,3-trifluoropropan-2-ol compound will yield a single isomeric 3,3,3-trifluoro-1-propene compound whereas in the case of a non-stereospecific dehydration a mixture of isomers, separable by fractional crystallization, is formed.

The compounds of the invention have useful pharmacological and especially hormonal activities. They are potent estrogens and exhibit a high level of activity upon oral administration. They are also hypocholesteremic agents and, along with an estrogenic response, produce a fall in the level of blood cholesterol.

The invention is illustrated by the following example.

Example

Over a 40 minute period, 12 ml. of thionyl chloride is added to a stirred solution of 5.8 g. of 1-(2-pyridyl)-1,2-diphenyl-3,3,3-trifluoropropan-2-ol (isomer melting at 159–160° C.) in 28 ml. of pyridine at 0–5° C. Stirring is continued for three hours at room temperature and then the reaction mixture is diluted with a large volume of anhydrous ether, cooled to 5° C. and cautiously diluted with water to decompose excess thionyl chloride. The solution is made strongly alkaline with 15% sodium hydroxide solution and the ether phase is separated. Additional ether extracts are obtained and the combined ether solution is washed with water, dried over magnesium sulfate and evaporated to give an oily residue. The oil is crystallized from aqueous ethanol to give a small crop of starting material and then subsequent crystalline crops of 1-(2-pyridyl)-1,2-diphenyl-3,3,3-trifluoro-1-propene; stereoisomer melting at 89–90° C. after two more crystallizations from ethanol. The other stereoisomer is obtained as follows. Thionyl chloride (12 ml.) is slowly added to a stirred solution of 5.5 g. of 1-(2-pyridyl)-1,2-diphenyl-3,3,3-trifluoropropan-2-ol (isomer melting at 190–190.5° C.) in 70 ml. of pyridine at 30–35° C. Stirring is continued for three hours and then the mixture is diluted with a large volume of anhydrous ether, cooled and cautiously diluted with water to decompose excess thionyl chloride. The solution is made strongly basic with sodium hydroxide solution and the ether phase is separated and evaporated. The residue is crystallized from ethanol to give a small crop of starting material and then crops of 1-(2-pyridyl)-1,2-diphenyl-3,3,3-trifluoro-1-propene, stereoisomer melting at 110–112.5° C. after purification by recrystallization from ethanol.

The 1-(2-pyridyl)-1,2-diphenyl-3,3,3-trifluoropropan-2-ol used as starting material is prepared as follows. A solution of phenyllithium is prepared by adding 2 ml. of bromobenzene to a stirred suspension of 7 g. of finely divided lithium ribbon in a small volume of anhydrous ether, heating to initiate the reaction and adding a solution of 71 g. of bromobenzene in 1000 ml. of ether at a rate sufficient to maintain the reaction mixture under rapid reflux. Stirring is continued for one more hour and then 68 g. of 2-benzylpyridine in 200 ml. of ether is added at reflux temperature. A dark red-orange color develops. Stirring and heating at reflux is continued for an additional two hours and then 70 g. of trifluoroacetophenone in 200 ml. of ether is added over a 20 minute period. The reaction mixture is heated under reflux for four hours and allowed to stand overnight at room temperature. Excess lithium is decomposed by slowly adding 500 ml. of water. The product which separates is collected on a filter and dried to give a first crop consisting of 72 g. of a white solid, M.P. 160–164° C. A second crop (32 g.), M.P. 153–155° C., and a third crop (7.5 g.), M.P. 150–152° C. are obtained by successive concentrations of the filtrate. Further recrystallization of the first crop from ethanol-ethyl acetate yields 1-(2-pyridyl)-1,2-diphenyl-3,3,3-trifluoropropan-2-ol, stereoisomer melting at 190–190.5° C. Further recrystallization of the second crop from ethanol-ethyl acetate yields the lower melting diastereoisomer of 1-(2-pyridyl)-1,2-diphenyl-3,3,3-trifluoropropan-2-ol; M.P. 159–160° C.

By the substitution of 1-(2-pyridyl)-1-phenyl-2-(o-chlorophenyl)-3,3,3-trifluoropropan-2-ol in the foregoing procedure, the product obtained is 1-(2-pyridyl)-1-phenyl-2-(o-chlorophenyl)-3,3,3-trifluoro-1-propene.

By the substitution of 1-(2-pyridyl)-1-phenyl-2-(p-methoxyphenyl)-3,3,3-trifluoropropan-2-ol in the foregoing procedure, the product obtained is 1-(2-pyridyl)-1-phenyl-2-(p-methoxyphenyl)-3,3,3-trifluoro-1-propene.

By the substitution of 1-(2-pyridyl)-1-(p-chlorophenyl)-2-phenyl-3,3,3-trifluoropropan-2-ol in the foregoing procedure, the product obtained is 1-(2-pyridyl)-1-(p-chlorophenyl)-2-phenyl-3,3,3-trifluoro-1-propene.

We claim:
1. 3,3,3-trifluoro-1-propene compounds of the formula

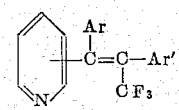

where Ar is a member of the class consisting of phenyl and chlorophenyl, and Ar' is a member of the class consisting of phenyl, chlorophenyl and methoxyphenyl.

2. 1-(2-pyridyl)-1,2-diphenyl-3,3,3-trifluoro-1-propene.

References Cited by the Examiner

UNITED STATES PATENTS 2,727,899  12/55  Bernstein _____ 260—297
2,863,802  12/58  Pyne _____ 260—297

OTHER REFERENCES

Fieser et al., "Steriods," Reinhold Publishing Corp., New York (1959), p. 690.

WALTER A. MODANCE, *Primary Examiner.*
NICHOLAS S. RIZZO, *Examiner.*